United States Patent
Seaman et al.

(10) Patent No.: US 8,764,361 B2
(45) Date of Patent: Jul. 1, 2014

(54) RATCHET NUT ASSEMBLY

(71) Applicant: Bemis Manufacturing Company, Sheboygan Falls, WI (US)

(72) Inventors: John Seaman, Sheboygan Falls, WI (US); Joseph Hand, Sheboygan Falls, WI (US); Patrick J. Raymakers, Sheboygan, WI (US)

(73) Assignee: Bemis Manufacturing Company, Sheboygan Falls, WI (US)

( * ) Notice: Subject to any disclaimer, the term of this patent is extended or adjusted under 35 U.S.C. 154(b) by 0 days.

(21) Appl. No.: 13/832,371

(22) Filed: Mar. 15, 2013

(65) Prior Publication Data
US 2014/0119849 A1    May 1, 2014

Related U.S. Application Data

(60) Provisional application No. 61/719,299, filed on Oct. 26, 2012.

(51) Int. Cl.
*F16B 31/00*    (2006.01)

(52) U.S. Cl.
USPC .................................. 411/7; 411/89; 411/125

(58) Field of Classification Search
CPC ...... F16B 31/02; F16B 31/027; F16B 31/028; F16B 5/0208; F16B 37/14; F16B 33/002; F16B 39/02; F16L 19/005; B27B 5/32; A61H 33/6063
USPC ............... 411/7, 89, 114, 125, 128, 145, 978
See application file for complete search history.

(56) References Cited

U.S. PATENT DOCUMENTS

| | | | |
|---|---|---|---|
| 328,244 A | 10/1885 | Morningstar |
| 642,596 A | 2/1900 | Forney |
| 1,038,834 A | 9/1912 | Bloom |
| 2,685,812 A | 8/1954 | Dmitroff |
| 2,783,810 A | 3/1957 | Wrigley |
| 3,254,363 A | 6/1966 | Watson |
| 3,280,689 A | 10/1966 | Rubin |

(Continued)

OTHER PUBLICATIONS

International Search Report from the International Searching Authority for International Application No. PCT/US2013/066955 dated Mar. 25, 2014 (12 pages).

(Continued)

*Primary Examiner* — Roberta Delisle
(74) *Attorney, Agent, or Firm* — Michael Best & Friedrich LLP

(57) ABSTRACT

A ratchet nut assembly includes an inner member, an outer member, and a spring clip. The inner member includes an outwardly extending tooth. The outer member is positioned around a portion of the inner member and includes an inwardly extending pawl. The pawl is engageable with the tooth to rotate the inner member with the outer member in a first direction when a torque applied to the outer member is below a predetermined value and is operable to deflect outwardly to allow rotation of the outer member relative to the inner member in the first direction when the torque applied to the outer member is above the predetermined value. The pawl is engageable with the tooth to prevent rotation of the outer member relative to the inner member in a second direction. The spring clip is positioned around a portion of the outer member to limit deflection of the pawl.

25 Claims, 5 Drawing Sheets

(56) References Cited

U.S. PATENT DOCUMENTS

| | | | |
|---|---|---|---|
| 3,289,524 A | 12/1966 | Rubin | |
| 3,368,602 A * | 2/1968 | Boyd | 411/105 |
| 3,419,057 A * | 12/1968 | Hogan | 411/125 |
| 3,425,314 A | 2/1969 | Ohlson | |
| 3,709,087 A | 1/1973 | Stone, Jr. | |
| 4,083,393 A | 4/1978 | Okada | |
| 4,176,582 A | 12/1979 | Witte | |
| 4,319,365 A | 3/1982 | Bemis et al. | |
| 4,392,279 A | 7/1983 | Schwager | |
| 4,416,048 A | 11/1983 | Otte | |
| 4,687,392 A | 8/1987 | Bidwell | |
| 4,749,318 A | 6/1988 | Bredal | |
| 4,970,731 A | 11/1990 | Fait | |
| 5,178,500 A | 1/1993 | Stencel | |
| 5,215,336 A * | 6/1993 | Worthing | 285/81 |
| 5,238,342 A | 8/1993 | Stencel | |
| 5,460,468 A | 10/1995 | DiStacio | |
| 5,711,645 A | 1/1998 | Sanbonmatsu et al. | |
| 5,713,708 A | 2/1998 | Van derDrift | |
| RE35,937 E | 10/1998 | DiStasio et al. | |
| 5,951,224 A | 9/1999 | DiStasio | |
| 6,012,886 A | 1/2000 | Tanamura et al. | |
| 6,102,639 A | 8/2000 | DiStasio | |
| 6,264,411 B1 | 7/2001 | DiStasio et al. | |
| 6,338,167 B1 | 1/2002 | Baker et al. | |
| 6,557,900 B1 * | 5/2003 | Austin | 285/92 |
| 6,679,663 B2 | 1/2004 | DiStasio et al. | |
| 6,905,297 B2 | 6/2005 | DiStasio et al. | |
| 7,029,216 B2 | 4/2006 | McKay | |
| 7,189,044 B2 | 3/2007 | Ball | |
| 7,203,975 B2 | 4/2007 | Vierkant, III | |
| 7,374,495 B2 | 5/2008 | Ball | |
| 7,641,429 B2 | 1/2010 | DiStasio et al. | |
| 8,032,954 B2 | 10/2011 | Furukawa et al. | |
| 2008/0209620 A1 | 9/2008 | Hand et al. | |
| 2009/0276944 A1 | 11/2009 | Hand et al. | |
| 2010/0125935 A1 | 5/2010 | Leibfried | |

OTHER PUBLICATIONS

International Written Opinion from the International Searching Authority for International Application No. PCT/US2013/066955 dated Mar. 25, 2014 (4 pages).

* cited by examiner

US 8,764,361 B2

RATCHET NUT ASSEMBLY

CROSS-REFERENCE TO RELATED APPLICATIONS

The present application claims priority to U.S. Provisional Patent Application No. 61/719,299, filed Oct. 26, 2012, the entire contents of which are incorporated by reference herein.

BACKGROUND

The present invention relates to fasteners and, more particularly, to ratchet nuts for use with threaded fasteners.

Ratchet nuts are known. A ratchet nut typically includes at least one wall that can deflect to inhibit the amount of torque that is applied to the nut. Such nuts, however, are usually bulky and/or long. In addition, the deflectable walls may fatigue from repeated use such that less torque can be applied to the nut before the walls deflect.

SUMMARY

In one embodiment, the invention provides a ratchet nut assembly for use with a threaded member. The ratchet nut assembly includes an inner member configured to thread onto the threaded member. The inner member includes an outwardly extending tooth. The ratchet nut assembly also includes an outer member positioned around a portion of the inner member and configured to be engaged by a tool. The outer member includes an inwardly extending pawl. The pawl is engageable with the tooth to rotate the inner member with the outer member in a first direction when a torque applied to the outer member is below a predetermined value and is operable to deflect outwardly to allow rotation of the outer member relative to the inner member in the first direction when the torque applied to the outer member is above the predetermined value. The pawl is also engageable with the tooth to prevent rotation of the outer member relative to the inner member in a second direction. The ratchet nut assembly further includes a spring clip positioned around a portion of the outer member to limit deflection of the pawl.

In another embodiment, the invention provides a toilet including a toilet bowl having an opening and a hinge mounted on the toilet bowl. The hinge includes a threaded member extending through the opening. The toilet also includes a toilet seat pivotally coupled to the hinge and a ratchet nut assembly. The ratchet nut assembly includes an inner member threaded onto the threaded member. The inner member includes an outwardly extending tooth. The ratchet nut assembly also includes an outer member positioned around a portion of the inner member and configured to be engaged by a tool. The outer member includes an inwardly extending pawl. The pawl is engageable with the tooth to rotate the inner member with the outer member in a first direction when a torque applied to the outer member is below a predetermined value and is operable to deflect outwardly to allow rotation of the outer member relative to the inner member in the first direction when the torque applied to the outer member is above the predetermined value. The pawl also is engageable with the tooth to prevent rotation of the outer member relative to the inner member in a second direction. The ratchet nut assembly further includes a spring clip positioned around a portion of the outer member to limit outward deflection of the pawl.

Other aspects of the invention will become apparent by consideration of the detailed description and accompanying drawings.

DETAILED DESCRIPTION

Figure 1:
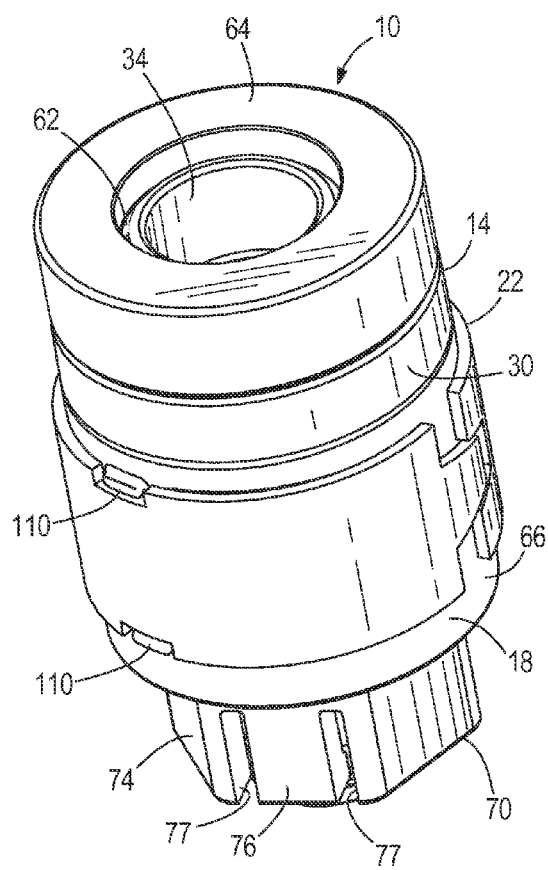
FIG. 1 is a perspective view of a ratchet nut assembly embodying the invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. In addition, the terms "top," "bottom," "upper," "lower," etc. are used to facilitate description with respect to the orientations shown in the drawings and are not intended to be limiting.

FIGS. 1-5 illustrate a ratchet nut assembly 10 according to one embodiment of the invention. The nut assembly 10 is usable with a threaded member, such as a bolt, to secure the fastener in place. The nut assembly 10 includes a ratchet mechanism that limits over-tightening of the assembly 10 on the threaded member.

The illustrated ratchet nut assembly 10 includes an inner member 14, an outer member 18, and a spring clip 22. In some embodiments, the inner and outer members 14, 18 may be composed of a plastic material, such as nylon (e.g., 33% glass filled nylon). In addition, the inner and outer members 14, 18 may be injection molded as unitary bodies. In other embodiments, the inner and outer members 14, 18 may be molded or machined from other materials.

Figure 2:
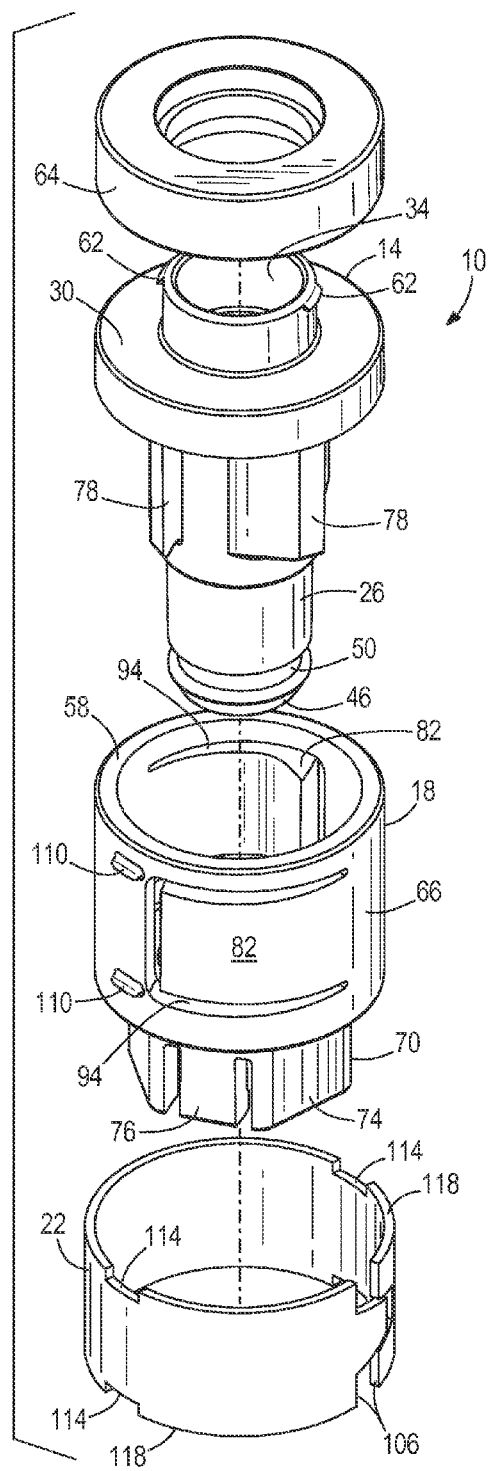
FIG. 2 is an exploded perspective view of the ratchet nut assembly.
Figure 3:
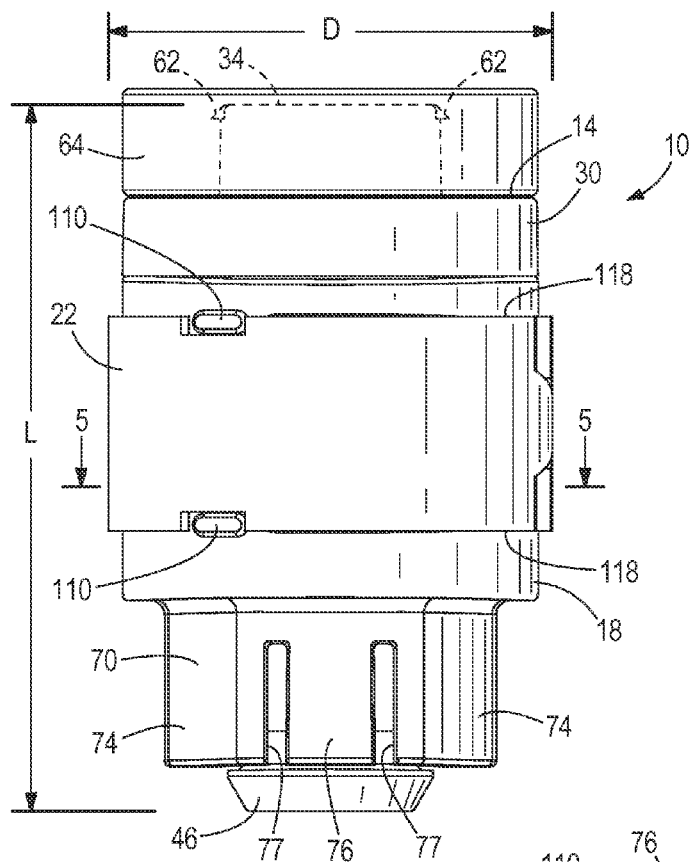
FIG. 3 is a side view of the ratchet nut assembly.
Figure 4:
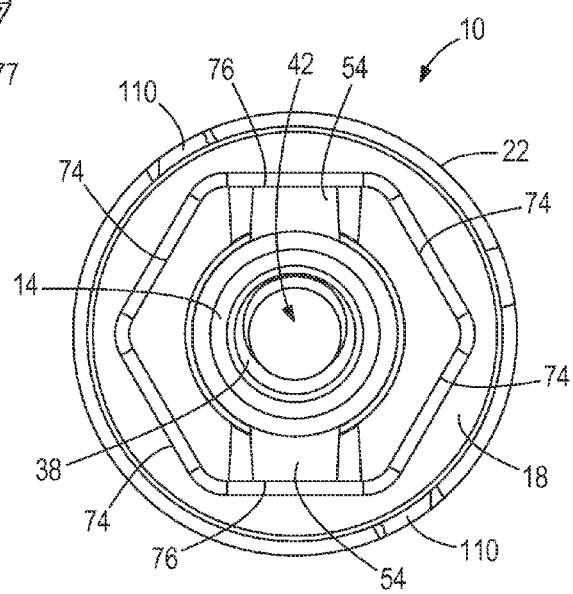
FIG. 4 is a bottom end view of the ratchet nut assembly.
Figure 5:
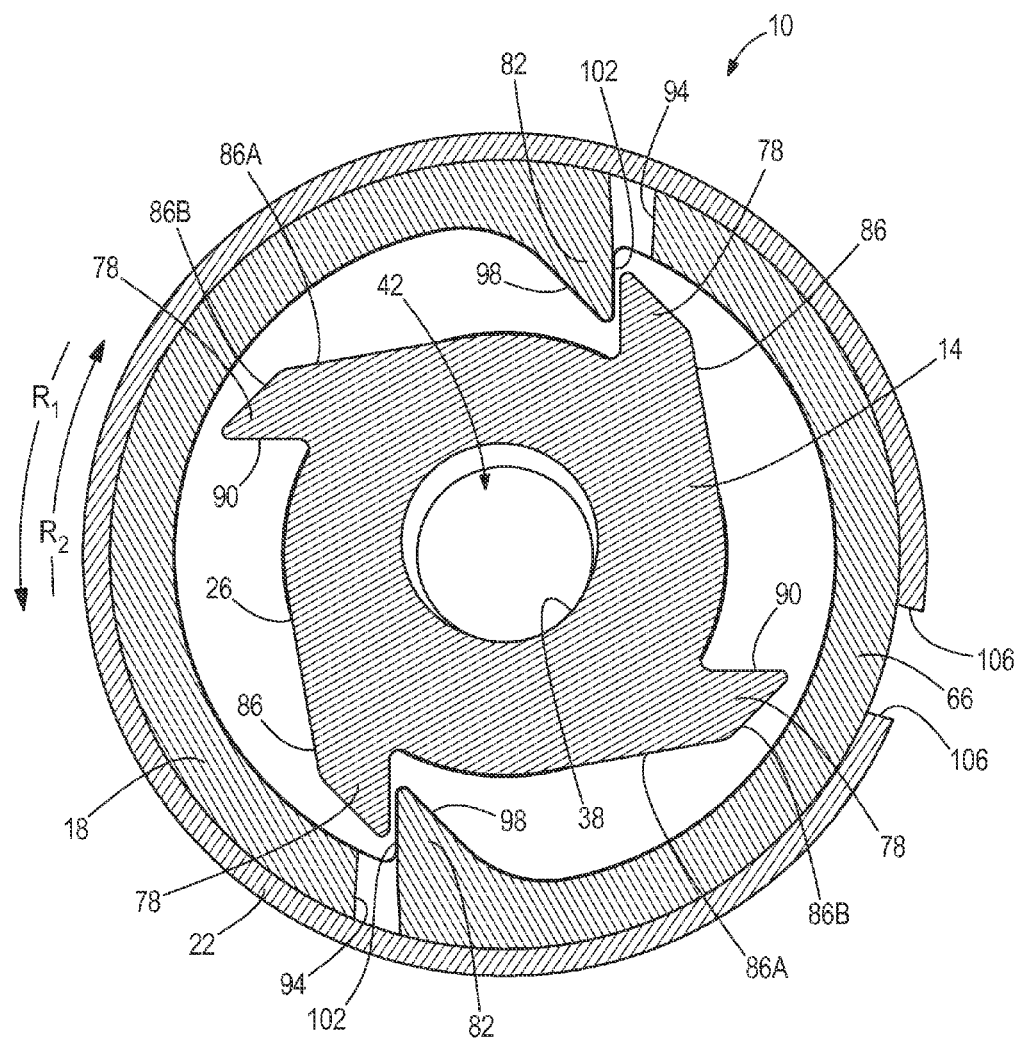
FIG. 5 is a cross-sectional view of the ratchet nut assembly taken along section line 5-5 of FIG. 3.

As shown in FIG. 2, the inner member 14 includes a generally cylindrical body 26, an annular flange 30, and an annular neck 34. The body 26 includes an inner threaded surface 38 that defines a bore 42 (FIGS. 4 and 5). The threaded surface 38 is configured to engage corresponding threads on a bolt (e.g., one of the bolts 208 of FIG. 8) to rotatably couple the nut assembly 10 to the bolt. The body 26 also includes (see FIG. 2) a tapered end 46 and defines an annular recess 50 adjacent the end 46. The recess 50 receives corresponding tabs 54 (FIG. 6) of the outer member 18 such that the outer member 18 can be snap-assembled onto the inner member 14. The flange 30 and the neck 34 are coupled to an end of the body 26 (the upper end in FIGS. 1-3) opposite from the tapered end 46. The flange 30 has generally the same diameter as the outer member 18 and contacts an upper surface 58 of the outer member 18 when assembled. The neck 34 extends axially from the flange 30 and is configured to receive one or more washers. In some embodiments, such as the illustrated embodiment, two tabs 62 are formed on and extend radially from the neck 34. The tabs 62 are tapered such that one or more washers 64 may be snap-assembled onto the neck 34 and captured between the flange 30 and the tabs 62. In other embodiments, the tabs 62 may be omitted.

The outer member 18, or sleeve, includes a cylindrical body 66 and an engagement portion 70. The body 66 of the outer member 18 receives the body 26 of the inner member 14 such that the outer member 18 is positioned around and surrounds a portion of the inner member 14. The engagement portion 70 extends axially from an end of the body 66. The illustrated engagement portion 70 includes six generally planar peripheral surfaces 74 that are arranged in a hexagonal shape like a conventional nut. The planar surfaces 74 facilitate engagement by a tool, such as a wrench, to rotate the nut assembly 10 onto a bolt.

Figure 6:
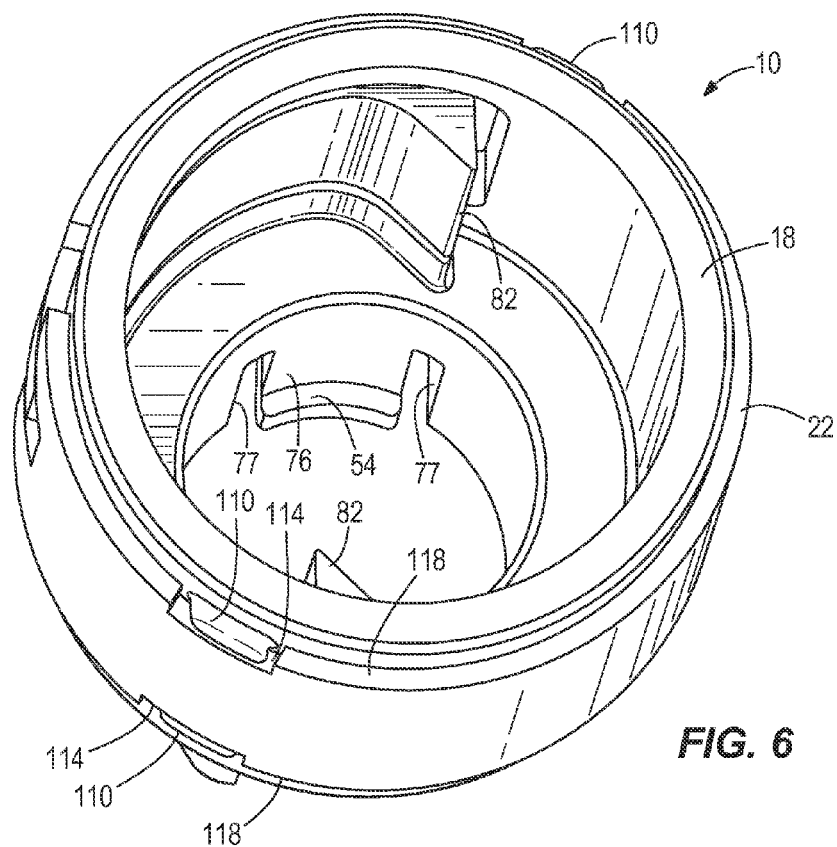
FIG. 6 is a perspective view of the ratchet nut assembly with an inner member removed.

As shown in FIGS. 5 and 6, the engagement portion 70 also includes the tabs 54 that engage the annular recess 50 (FIG. 2) of the inner member 14. The tabs 54 extend radially inward to secure the members 14, 18 together. As shown in FIGS. 2, 3, and 6, the tabs 54 are positioned on cantilevered portions 76 of the engagement portion 70. The cantilevered portions 76 are defined by two parallel slots 77 that extend through the corresponding planar surfaces 74. The slots 77 are formed on opposite sides of the tabs 54 such that the tabs 54 are deflectable radially outward to clear the tapered end 46 of the inner member 14. When the inner member 14 is slid into the outer member 18 and the tabs 54 snap into the recess 50, the outer member 18 is captured and held between the flange 30 and the tapered end 46 of the inner member 14. In other embodiments, the tabs 54 may extend from the inner member 14, and the recess 50 may be formed on the outer member 18.

As shown in FIGS. 2 and 5, the inner and outer members 14, 18 form the ratchet mechanism of the nut assembly 10. In the illustrated embodiment, the inner member 14 includes four outwardly extending teeth 78 (a circumferential ratchet), and the outer member 18 includes two inwardly extending pawls 82. In other embodiments, the ratchet nut assembly 10 may include fewer or more teeth 78 and/or pawls 82.

Referring to FIG. 5, the illustrated teeth 78 are spaced approximately 90 degrees apart and extend from the body 26 of the inner member 14 toward the outer member 18. Each tooth 78 includes a ramped surface 86 and an undercut surface 90. Each ramped surface 86 includes a first surface portion 86A having a relatively steep incline, and a second surface portion 86B having a relatively shallow incline. As further discussed below, the ramped surfaces 86 are configured to engage the pawls 82 to deflect the pawls 82 outward, allowing rotation of the inner member 14 in a clockwise direction (as shown in FIG. 5) relative to the outer member 18. The undercut surfaces 90 are configured to engage the pawls 82 to prevent rotation of the inner member 14 in a counterclockwise direction (as shown in FIG. 5) relative to the outer member 18.

The illustrated pawls 82 are spaced approximately 180 degrees apart and extend from the body 66 of the outer member 18 toward the inner member 14. In the illustrated embodiment, a slot 94 (FIG. 2) is formed around three sides of each pawl 82 such that the pawls 82 are cantilevered. Each pawl 82 includes (see FIG. 5) a ramped surface 98 and a shoulder surface 102. When the outer member 18 is rotated in a first direction $R_1$ (i.e., counterclockwise in FIG. 5), the ramped surfaces 98 of the pawls 82 engage the ramped surfaces 86 of two of the teeth 78. When the outer member 18 is rotated in a second direction $R_2$ (i.e., clockwise in FIG. 5), the shoulder surfaces 102 of the pawls 82 engage the undercut surfaces 90 of two of the teeth 78.

In operation, the outer member 18 is rotated in the first direction $R_1$ to thread onto a bolt or other threaded fastener. Initially, when a relatively small torque is applied to the outer member 18, the ramped surfaces 86 of two teeth 78 engage the ramped surfaces 98 of the pawls 82 such that the inner member 14 and the outer member 18 rotate together. In particular, the ramped surfaces 98 of the pawls 82 engage the first surface portions 86A of the teeth 78. As the torque required to rotate the nut assembly 10 increases (e.g., as the nut assembly 10 tightens on the bolt), the ramped surfaces 98 of the pawls 82 ride up the first surface portions 86A and engage the second surface portions 86B of the teeth 78. When the torque reaches a certain predetermined value, the pawls 82 deflect radially outward to slip over and past the teeth 78. At this point, further rotation of the outer member 18 in the first direction $R_1$ will not result in further tightening because the outer member 18 will simply rotate relative to the inner member 14. The amount of torque required to create relative rotation between the inner and outer members 14, 18 may be based on, for example, the strength of materials used, the shape (e.g., slope) and size (e.g., length) of the ramped surfaces 86, 98, the number of teeth 78 and pawls 82, etc.

When the outer member 18 is rotated in the second direction $R_2$ to loosen or unthread the nut assembly 10 from the bolt, the undercut surfaces 90 of two teeth 78 engage the shoulder surfaces 102 of the pawls 82 (as illustrated in FIG. 5). In this position, the pawls 82 push the teeth 78, forcing the inner member 14 to rotate with the outer member 18. In addition, the configurations of the undercut surfaces 90 and the shoulder surfaces 102 prevent the pawls 82 from deflecting outwardly and slipping over the teeth 78. The inner and outer members 14, 18 are thereby constantly rotated together in the second direction $R_2$ such that the ratchet nut assembly 10 can be unthreaded from the bolt and reused.

The spring clip 22 is positioned around the body 66 of the outer member 18 to limit outward deflection of the pawls 82 when the ratchet nut assembly 10 is rotated in the first direction $R_1$. The illustrated spring clip 22 is an annular, but not complete, band that may be composed of metal, such as spring steel. The spring clip 22 may be stamped and formed into an appropriate shape and size. The spring clip 22 wraps around the outer member 18 and generally covers the cantilevered pawls 82. As shown in FIG. 5, the spring clip 22 is slightly shorter than an outer diameter of the outer member 18 such that ends 106 of the clip 22 are spaced apart when the clip 22 is positioned around the member 18. The spring clip 22 maintains a relatively tight engagement with the outer member 18 such that both the pawls 82 and the spring clip 22 deflect outward in order for the teeth 78 to slip past the pawls 82.

As shown in FIGS. 1-3 and 6, two projections 110 extend from the outer member 18 adjacent each of the pawls 82. The spring clip 22 includes (see FIG. 7) recesses 114, or notches, formed in opposing edges 118 of the spring clip 22 to receive the projections 110. The projections 110 extend into the recesses 114 to keep the spring clip 22 properly axially and radially aligned with the pawls 82. That is, the projections 110 inhibit axial movement of the spring clip 22 along the outer member 18. The projections 110 also inhibit rotation (radial movement) of the spring clip 22 around the outer member 18. In the illustrated embodiment, the spring clip 22 includes four recesses 114 corresponding to the four projections 110 of the outer member 18. In other embodiments, the outer member 18 may include fewer or more projections 110, and the spring clip 22 may include fewer or more recesses 114. In still other embodiments, the recesses 114 may be formed in the outer member 18, and the projections 110 may extend from the spring clip 22.

Figure 7:
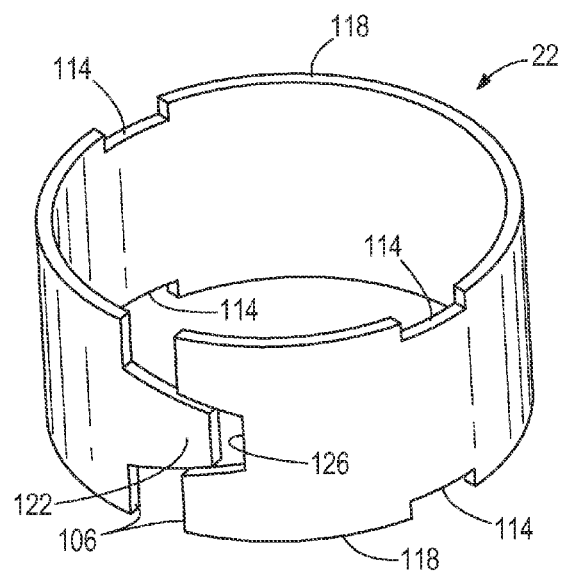
FIG. 7 is a perspective view of a spring clip of the ratchet nut assembly.

As shown in FIG. 7, the spring clip 22 further includes a projection 122 extending from one end 106 of the clip 122 and a notch 126 formed in the other end 106 of the clip 22. The projection 122 and the notch 126 are generally trapezoidalshaped so that the projection 122 fits within the notch 126. Such an arrangement facilitates wrapping the spring clip 22 entirely around the outer member 18. In addition, the projection 122 and the notch 126 inhibit the spring clip 134 from twisting or becoming skewed relative to the outer member 18.

By positioning the spring clip 22 around the outer member 18, the amount of torque required to deflect the pawls 82 is increased. In addition, the spring clip 22 limits the amount each of the pawls 82 may deflect radially outward, thereby inhibiting the pawls 82 from deflecting beyond the yield strength of the material from which they are made. The spring clip 22 also allows the ratchet nut assembly 10 to be more compact. For example, referring to FIG. 3, the ratchet nut assembly 10 has an overall length L and an overall diameter D. In the illustrated embodiment, a ratio of the overall length L to the overall diameter D is between about 1.5 and about 2.0. Furthermore, the overall length L of the ratchet nut assembly 10 is less than about 1.5 inches.

Figure 8:
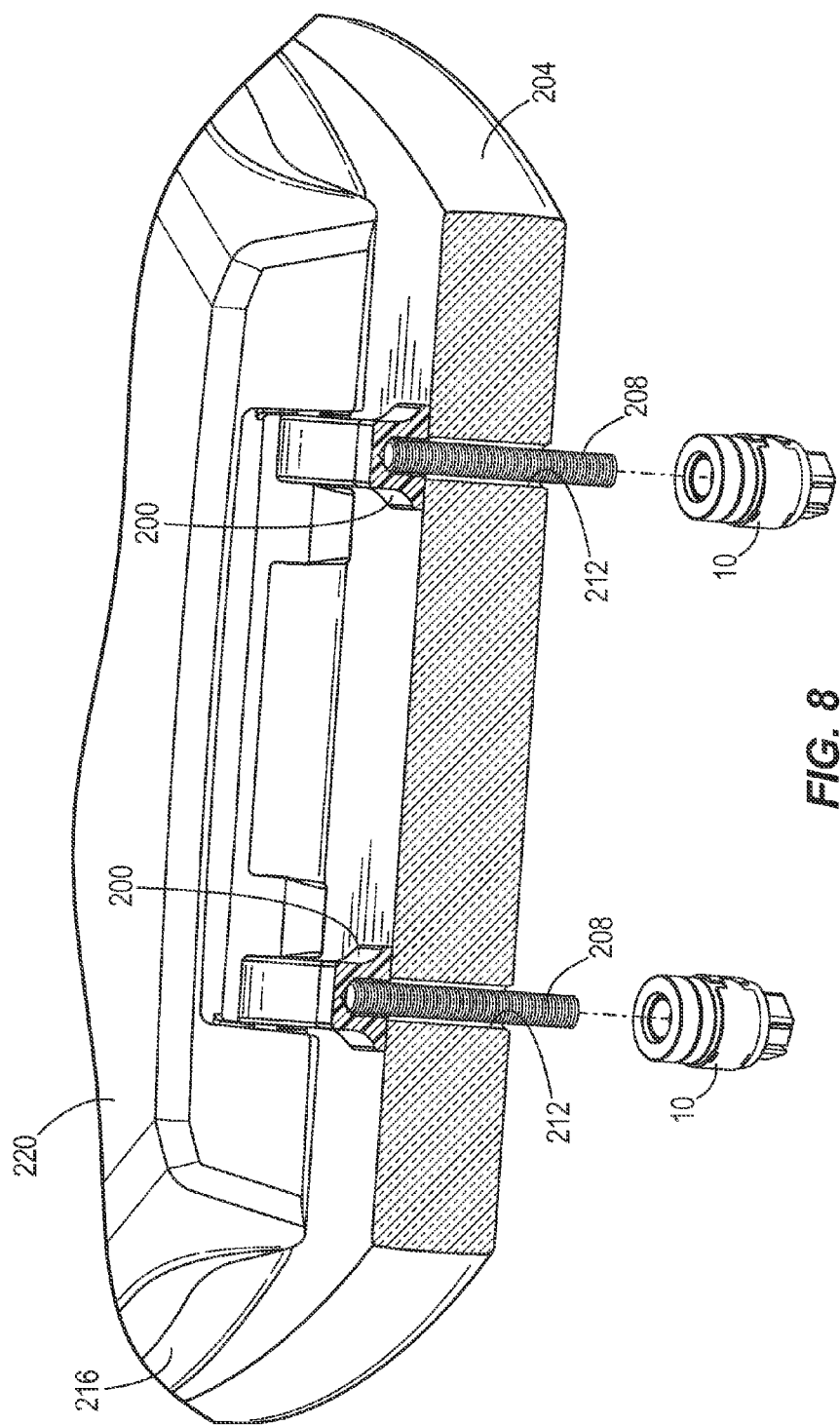
FIG. 8 is a rear cross-sectional view of a portion of a toilet that includes two ratchet nut assemblies.

As shown in FIG. 8, two nut assemblies 10 are used to mount two toilet seat hinges 200 to a toilet bowl 204. Each hinge 200 includes a bolt 208 that extends through a corresponding opening 212 in the toilet bowl 204. The nut assemblies 10 thread onto ends of the bolts 208 beneath the toilet bowl 204 to secure the hinges 200 in place. When secured, the hinges 200 pivotally couple a ring or seat 216 and a lid or cover 220 to the toilet bowl 204. In other embodiments, the nut assembly 10 may be used with a bolt to secure other structures together.

Various features and advantages of the invention are set forth in the following claims.

What is claimed is:

1. A ratchet nut assembly for use with a threaded member, the ratchet nut assembly comprising:
    an inner member configured to thread onto the threaded member, the inner member including an outwardly extending tooth;
    an outer member positioned around a portion of the inner member and configured to be engaged by a tool, the outer member including an inwardly extending pawl, the pawl being engageable with the tooth to rotate the inner member with the outer member in a first direction when a torque applied to the outer member is below a predetermined value and being operable to deflect outwardly to allow rotation of the outer member relative to the inner member in the first direction when the torque applied to the outer member is above the predetermined value, the pawl also being engageable with the tooth to prevent rotation of the outer member relative to the inner member in a second direction; and
    a spring clip positioned around a portion of the outer member to limit outward deflection of the pawl.

2. The ratchet nut assembly of claim 1, wherein the spring clip is an annular, but not complete, band.

3. The ratchet nut assembly of claim 2, wherein the spring clip does not extend completely circumferentially around the outer member such that opposing ends of the spring clip are spaced apart from each other.

4. The ratchet nut assembly of claim 2, wherein the spring clip includes a projection extending from one end and a notch formed in another end, and wherein the projection fits within the notch.

5. The ratchet nut assembly of claim 1, wherein a portion of the outer member engages a portion of the spring clip to inhibit axial movement of the spring clip relative to the outer member.

6. The ratchet nut assembly of claim 5, wherein one of the outer member and the spring clip includes a projection, and wherein the projection engages the other of the outer member and the spring clip to inhibit axial movement of the spring clip relative to the outer member.

7. The ratchet nut assembly of claim 1, wherein a portion of the outer member engages a portion of the spring clip to inhibit rotation of the spring clip relative to the outer member.

8. The ratchet nut assembly of claim 7, wherein one of the outer member and the spring clip includes a projection, wherein the other of the outer member and the spring clip defines a recess, and wherein the projection extends into the recess to inhibit rotation of the spring clip relative to the outer member.

9. The ratchet nut assembly of claim 1, wherein the tooth includes a ramped surface having a first surface portion with a relatively steep incline and a second surface portion with a relatively shallow incline.

10. The ratchet nut assembly of claim 9, wherein the pawl includes a ramped surface, and wherein the ramped surface of the tooth engages the ramped surface of the pawl when the outer member is rotated in the first direction.

11. The ratchet nut assembly of claim 10, wherein the tooth includes an undercut surface and the pawl includes a shoulder surface, and wherein the undercut surface of the tooth engages the shoulder surface of the pawl when the outer member is rotated in the second direction.

12. The ratchet nut assembly of claim 1, wherein the pawl is cantilevered.

13. The ratchet nut assembly of claim 1, wherein the outer member includes an engagement portion that is configured to be engaged by the tool, and wherein the engagement portion includes a plurality of planar surfaces.

14. The ratchet nut assembly of claim 13, wherein the outer member includes a cylindrical body that supports the pawl, and wherein the engagement portion extends axially from the cylindrical body.

15. The ratchet nut assembly of claim 1, wherein one of the inner member and the outer member includes a tab, wherein the other of the inner member and the outer member defines a recess, and wherein the tab engages the recess to secure the inner and outer members together.

16. The ratchet nut assembly of claim 15, wherein the tab is positioned on a cantilevered portion of the outer member such that the tab is deflectable radially outward.

17. The ratchet nut assembly of claim 1, wherein the inner member includes four outwardly extending teeth, and wherein the outer member includes two inwardly extending pawls.

18. The ratchet nut assembly of claim 1, wherein the inner member and the outer member are composed of plastic material, and wherein the spring clip is composed of metal.

19. A toilet comprising:
    a toilet bowl having an opening;
    a hinge mounted on the toilet bowl, the hinge including a threaded member extending through the opening;
    a toilet seat pivotally coupled to the hinge; and
    a ratchet nut assembly including
        an inner member threaded onto the threaded member, the inner member including an outwardly extending tooth,
        an outer member positioned around a portion of the inner member and configured to be engaged by a tool, the outer member including an inwardly extending pawl, the pawl being engageable with the tooth to rotate the inner member with the outer member in a first direction when a torque applied to the outer member is below a predetermined value and being operable to deflect outwardly to allow rotation of the outer member relative to the inner member in the first direction when the torque applied to the outer member is above the predetermined value, the pawl also being engageable with the tooth to prevent rotation of the outer member relative to the inner member in a second direction, and a spring clip positioned around a portion of the outer member to limit outward deflection of the pawl.

20. The toilet of claim 19, wherein the spring clip of the ratchet nut assembly is an annular band that does not extend completely circumferentially around the outer member such that opposing ends of the spring clip are spaced apart from each other.

21. The toilet of claim 19, wherein one of the outer member and the spring clip of the ratchet nut assembly includes a projection, wherein the other of the outer member and the spring clip of the ratchet nut assembly defines a recess, and wherein the projection extends into the recess to inhibit axial movement and rotation of the spring clip relative to the outer member.

22. The toilet of claim 19, wherein the tooth of the ratchet nut assembly includes a ramped surface and an undercut surface, wherein the pawl of the ratchet nut assembly includes a ramped surface and a shoulder surface, wherein the ramped surface of the tooth engages the ramped surface of the pawl when the outer member is rotated in the first direction, and wherein the undercut surface of the tooth engages the shoulder surface of the pawl when the outer member is rotated in the second direction.

23. The toilet of claim 19, wherein the pawl of the ratchet nut assembly is cantilevered.

24. The toilet of claim 19, wherein one of the inner member and the outer member of the ratchet nut assembly includes a tab, wherein the other of the inner member and the outer member of the ratchet nut assembly defines a recess, and wherein the tab engages the recess to secure the inner and outer members together.

25. The toilet of claim 24, wherein the tab is positioned on a cantilevered portion of the outer member such that the tab is deflectable radially outward.

\* \* \* \* \*